United States Patent
Nagata

(10) Patent No.: US 9,399,250 B2
(45) Date of Patent: Jul. 26, 2016

(54) THREAD ROLLING METHOD FOR GEAR USING CYLINDRICAL DIES

(71) Applicant: AISIN SEIKI KABUSHIKI KAISHA, Kariya-shi (JP)

(72) Inventor: Eiri Nagata, Kariya (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 64 days.

(21) Appl. No.: 14/350,630

(22) PCT Filed: Dec. 4, 2012

(86) PCT No.: PCT/JP2012/081359
§ 371 (c)(1),
(2) Date: Apr. 9, 2014

(87) PCT Pub. No.: WO2013/088993
PCT Pub. Date: Jun. 20, 2013

(65) Prior Publication Data
US 2014/0245610 A1    Sep. 4, 2014

(30) Foreign Application Priority Data

Dec. 16, 2011  (JP) ................................ 2011-276173

(51) Int. Cl.
*B23P 15/14* (2006.01)
*B21H 5/02* (2006.01)
(Continued)

(52) U.S. Cl.
CPC . *B21H 5/02* (2013.01); *B23F 17/00* (2013.01); *B23P 6/00* (2013.01); *B23P 15/14* (2013.01); *Y10T 29/49471* (2015.01)

(58) Field of Classification Search
CPC ..... Y10T 29/49471; B21H 5/05; B21H 5/005
See application file for complete search history.

(56) References Cited

U.S. PATENT DOCUMENTS 2,367,612 A * 1/1945 Reed ............................... 72/100
3,606,782 A   9/1971 McNabb et al.
(Continued)

FOREIGN PATENT DOCUMENTS

CN  1041893 A  5/1990
CN  201405015 Y  2/2010
(Continued)

OTHER PUBLICATIONS

International Search Report issued Mar. 5, 2013, in PCT/JP12/081359 filed Dec. 4, 2012.
(Continued)

*Primary Examiner* — Sarang Afzali
*Assistant Examiner* — Ruth G Hidalgo-Hernande
(74) *Attorney, Agent, or Firm* — Oblon, McClelland, Maier & Neustadt, L.L.P.

(57) ABSTRACT

A thread rolling method for a gear using cylindrical dies in which no slippage occurs. The method includes placing a work having a cylindrical outer surface to be supported to a support to be freely rotatable about a rotation axis of the cylindrical outer surface; placing a pair of the cylindrical dies each rotatable about an axis parallel to the rotation axis to face each other across the work; thrusting the pair of cylindrical dies against the work; and determining an outer diameter of the work, when rotary movement of the cylindrical dies and the work rotated together is shifted from friction gear movement to gear movement, in which a dimension obtained by dividing an outer circumferential dimension of a dedendum circle of the tooth grooves by the number of teeth to be formed is equal to an addendum circular pitch of each of the cylindrical dies.

3 Claims, 4 Drawing Sheets

(51) Int. Cl.
  *B23F 17/00* (2006.01)
  *B23P 6/00* (2006.01)

(56) References Cited

U.S. PATENT DOCUMENTS

2003/0167813 A1  9/2003  Shinbutsu et al.
2011/0302783 A1  12/2011  Nagata et al.

FOREIGN PATENT DOCUMENTS

| CN | 102294419 A | | 12/2011 |
|---|---|---|---|
| DE | 915328 | * | 9/1954 |
| JP | 33-10773 | | 12/1958 |
| JP | 59-85338 A | | 5/1984 |
| JP | 2003-340542 A | | 12/2003 |
| JP | 2005-193302 | | 7/2005 |
| JP | 2007-290001 | | 11/2007 |
| JP | 2010-75963 | | 4/2010 |

OTHER PUBLICATIONS

Combined Chinese Office Action and Search Report issued Apr. 3, 2015 in Patent Application No. 201280062222.5 (with English Translation).

International Preliminary Report on Patentability and Written Opinion issued Jun. 26, 2014 in PCT/JP2012/081359 (English Translation only).

Extended European Search Report issued Dec. 4, 2015 in Patent Application 12858029.7.

* cited by examiner

THREAD ROLLING METHOD FOR GEAR USING CYLINDRICAL DIES

TECHNICAL FILED

The present invention relates to a thread rolling method for a gear using cylindrical dies in an apparatus including a work having a cylindrical outer surface, a retainer element for retaining the work to be freely rotatable about an axis of the cylindrical outer surface, and a drive mechanism for thrusting the pair of cylindrical dies against the work, in which the pair of cylindrical dies are each rotatable about an axis parallel to the axis to face each other across the work and are synchronized with each other in rotating speed and thrusting amount.

BACKGROUND ART

A thread rolling gear according to the present invention is used for various kinds of industrial products typically represented by automobile parts. For example, techniques for developing hybrid vehicles and electric-powered vehicles have been rapidly advancing in the automobile industry. In particular, a demand for power-saving and small-sized electric actuators in all kinds will increase in future. Further, it is required that components of those actuators have good efficiency in power transmission and manufacture.

A number of gears are used in the actuators. Those gears have great influence on the functions and the manufacturing costs of the actuators. As a method of manufacturing the gears efficiently, a thread rolling method for thrusting cylindrical dies against a cylindrical solid work is generally known, for example. In such a method, the pair of cylindrical dies each having a profile of a desired gear that are provided to face each other across the work are allowed to thrust against the surface of the work, synchronized with each other in rotating speed and thrusting speed against the work, thereby to form the gear.

The thread rolling method using the dies uses linear rack dies or the cylindrical dies. In the thread rolling method using the rack dies, addendums formed in an end portion of the rack dies having a fixed length are brought into press contact with the work and then fed with the dies being pressed against the work, thereby to allow the work to roll. In many cases, a tooth depth in the rack dies is different between an area in an early stage of the thread rolling process where the addendums begin to contact the work and an area in a finishing stage of the thread rolling process. Therefore, in the thread rolling using the rack dies, the profile of the gear to be formed is influenced by the length of the rack dies.

On the other hand, in the case of using the cylindrical dies, the cylindrical dies are rotated and concurrently thrust against the work. Therefore, the tooth profile is constant in any portion of the cylindrical dies, which provides a simple arrangement in the cylindrical dies. In addition, the rotating direction of the cylindrical dies can be switched over during the thread rolling process, which is advantageously applied to the thread rolling of large-sized worms and helical gears.

An example of the conventional thread rolling method using the cylindrical dies is disclosed in a published document indicated below. Such a method provides a thread rolling apparatus for helical gears, and worms and screws (mechanical elements having a lead in a flank), in which "slippage" can be reduced while simplifying the arrangement of the apparatus. In this, the "slippage" indicates a phenomenon in which the work moves along rotation axes of the cylindrical dies when the cylindrical dies are thrust against the work. This phenomenon occurs when the relative relationship between the addendums of the dies and tooth grooves formed in the surface of the work in advance is not proper. More particularly, the addendums of the dies are thrust against the tooth grooves of the work in a distorted manner to cause the dies and the work to follow advance/return motion of a screw, as a result of which the slippage occurs. When the slippage occurs, a portion of the surface of the work that should not be threaded is threaded, which makes quality maintenance difficult.

In the known technique described above, a biting tooth, a forming tooth, a finishing tooth and the like are provided in an outer circumference of each of the cylindrical dies provided to face each other across the work to form worms in the work during one rotation of each cylindrical die. A chamfered portion is provided in an axial one end of the outer circumference of each cylindrical die to allow the forming tooth or a clearance tooth to follow the worms in response to the axial movement of the work in forming the worms. The above prior art document describes that such an arrangement can eliminate the disadvantages caused by the slippage phenomenon without controlling the drive of the cylindrical dies by a controller.

CITATION LIST

Patent Literature

Patent Document 1: Japanese Unexamined Patent Application Publication No. 2010-075963 (paragraph 0052)

SUMMARY OF INVENTION

Technical Problem

On the other hand, since it is required to form the biting teeth, the forming teeth, the finishing teeth and the like in the outer circumference of the cylindrical die in the above conventional arrangement, a specially designed cylindrical die must be provided, which takes much time and effort in the manufacture and increases the manufacturing costs. In addition, since the conventional cylindrical die is driven for only one rotation against the work in the same manner as the rack die, the profile of the gear to be manufactured is limited. Thus, there is much room for improvement in forming the gear effectively in the conventional thread rolling method described above.

An object of the present invention is to achieve a thread rolling method for a gear using cylindrical dies capable of eliminating the above technical disadvantages and providing a proper tooth profile by the use of cylindrical dies in which no slippage occur during the processing.

Solution to Problem

[First Feature]

According to the present invention, a threaded rolling method for a gear using cylindrical dies includes the steps of placing a work having a cylindrical outer surface to be supported to a support to be freely rotatable about a rotation axis of the cylindrical outer surface, placing a pair of the cylindrical dies each rotatable about an axis parallel to the rotation axis to face each other across the work, thrusting the pair of cylindrical dies against the work, the cylindrical dies being synchronized with each other in rotating speed and thrusting amount via a drive mechanism, and determining an outer diameter of the work, when rotary movement of the cylindrical dies and the work rotated together is shifted from friction gear movement based on thrusting forces exerted from both the cylindrical dies and the work to gear movement based on the engagement between the work and the cylindrical dies at tooth grooves formed in the work by thrusting the cylindrical dies against the work, in which a dimension obtained by dividing an outer circumferential dimension of a dedendum circle of the tooth grooves by the number of teeth to be formed is equal to an addendum circular pitch of each of the cylindrical dies.

[Advantage and Effect]

In the thread rolling process for the gear using the cylindrical dies, the surface of the work in the initial stage is a plain cylindrical surface. The cylindrical dies and the works are rotated together in the friction gear movement when they start to come into contact with each other as the cylindrical dies thrust against the work. Further, as the thrusting by the cylindrical dies advance, the tooth grooves are formed on the surface of the work. When the cylindrical dies and the work are brought into mesh-engagement securely with each other, they are rotated together in the gear movement. Although slippage occurs when the rotating speed of the work is different between the two modes of the movement in this matter, such slippage occurring in the early stage is gradually suppressed. Once the slippage has subsided, the tooth profile is formed stably in the subsequent process.

According to the present invention, the initial outer diameter of the work is determined with the tooth grooves being securely formed in the work such that the dimension obtained by dividing the outer circumferential dimension of the dedendum circle of the tooth grooves by the number of teeth to be formed is equal to the addendum circular pitch of each of the cylindrical dies. More particularly, the outer diameter of the work is determined, taking into account the depth of the tooth grooves formed in the work when the rotary movement of the work is shifted from the friction gear movement to the gear movement. In such a case, the precise division by the teeth is completed when the tooth grooves are formed. Hence, the cylindrical dies and the work are rotated in a proper relative phase to avoid any slippage in the thread rolling process, as a result of which an accurate gear can be achieved.

[Second Feature]

According to the present invention, thrusting amount of the cylindrical dies against the work in shifting to the gear movement is preferably set to 0.1 mm to 0.3 mm.

[Advantage and Effect]

In order to thrust the cylindrical dies against the work without slippage, it is preferable to form a wall that limits the addendum of the cylindrical die peripherally on the work. Generally, the work to undergo the thread rolling is metal and has predetermined plastic deformability. More particularly, when the cylindrical dies are thrust against the work by 0.1 mm to 0.3 mm, each addendum of the cylindrical dies is surrounded by the wall having such a height. As a result, a sufficient resistance is exerted for restraining the addendum. If the thrusting amount is small, the cylindrical dies may slip on the work, and the division by the teeth cannot be completed. On the other hand, if the thrusting amount is too large, the initial outer diameter of the work becomes large and the division of the dedendums would be difficult, though the addendum is advantageously restrained. If the outer diameter of the work becomes large, a volume of the base material of the work for contributing to the formation of the addendums is increased. Thus, the tooth profile becomes improper, or additional processing is required for setting the dedendum depth of the cylindrical die to a larger value in order to absorb the extra volume of the base material, which may mar the efficiency.

[Third Feature]

According to the present invention, the pair of cylindrical dies may be thrust against the work intermittently while the rotary movement is shifted from the friction gear movement to the gear movement.

[Advantage and Effect]

With the above-described arrangement, the addendum of the die can be brought into contact with the surface of the work with an angle close to the normal direction by increasing the thrusting amount of the cylindrical dies intermittently while the rotary movement is shifted to the gear movement. Therefore, the occurrence of the slippage can be effectively restrained by reducing external force components applied from the teeth of the die to the work along the direction of the rotation axis or in a direction perpendicular to the direction of the rotation axis. In addition, since the thrusting operation of the cylindrical dies is performed intermittently in thrusting the addendums of the cylindrical dies against the surface of the work, the thrusting movement against all the tooth grooves can be uniform. In other words, the thrusting operation against all the tooth grooves is completed in a predetermined manner, and then additional thrusting operation is performed on each of the tooth grooves to form uniform tooth grooves over the entire circumference and complete the precise division. As a result, following thrusting operation is performed more reliably, which can achieve an accurate thread-rolling gear.

DESCRIPTION OF EMBODIMENTS

[Outline of Thread Rolling Apparatus]

Figure 1:
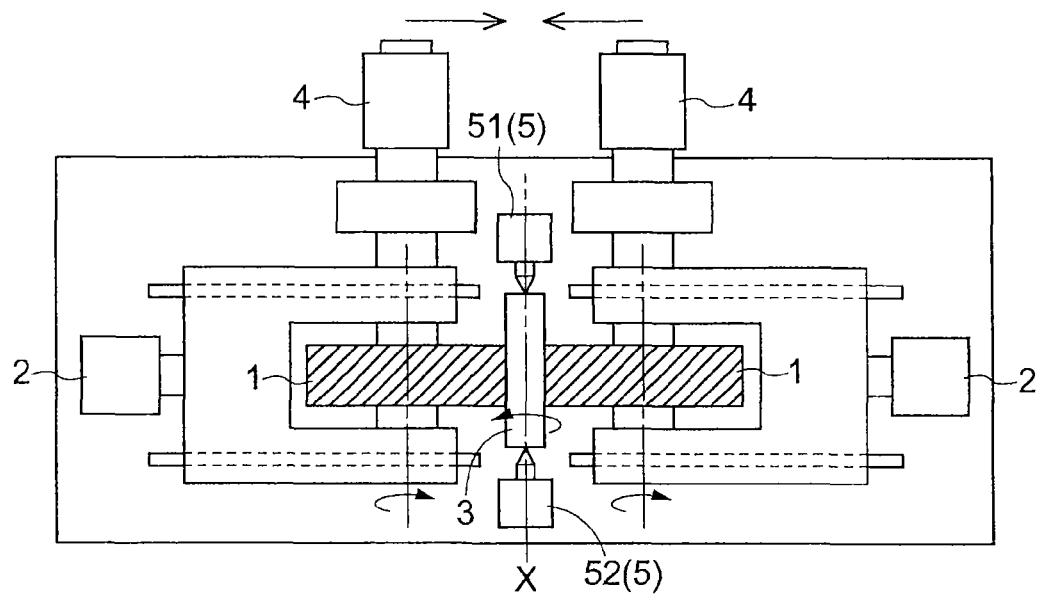
FIG. 1 is an illustrative view of a thread rolling apparatus.
Figure 2:
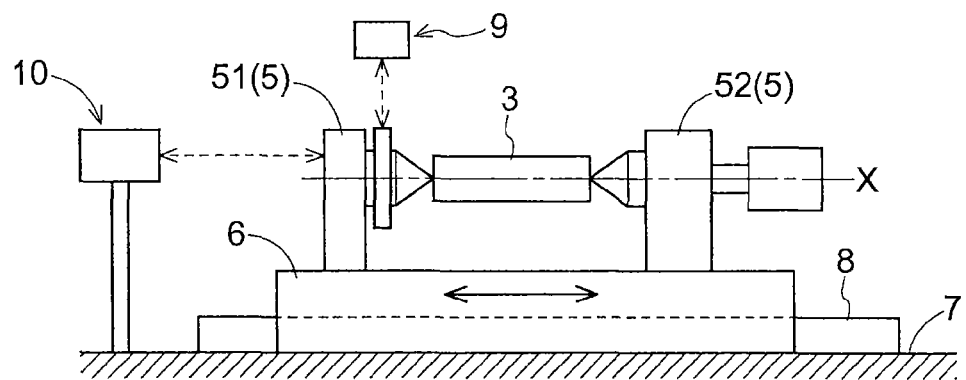
FIG. 2 is an illustrative view of a support structure for a work in the thread rolling apparatus.

A thread rolling method for a gear using cylindrical dies (simply referred to as "dies" or "die" hereinafter) according to the present invention will be described hereinafter in reference to the accompanying drawings. FIGS. 1 and 2 are schematic views of a thread rolling apparatus used in a current embodiment. A pair of dies 1 are thrust against a work 3 by hydraulic drive units 2, for example. Those dies 1 are rotated and driven by AC servomotors 4. The right and left dies 1 are synchronized with each other in rotating speed and thrusting amount by an unillustrated CNC device. As shown in FIG. 2, the work 3 is supported by opposite supports 5 aligned with a rotation axis X. The work 3 is freely driven by rotation of the dies 1 (rotated together). One of the supports 51 supporting the work 3 is fixed to a table 6. The other of the supports 52 is movable along the rotation axis X on the table 6. The support 52 pushes the work 3 along the rotation axis X by air pressure or the like, which can deal with stretch of the work 3 caused by thrusting the dies 1 against the work 3. The table 6 provided with the supports 51 and 52 is movable along a guide element 8 mounted on a bed 7 in the direction of the rotation axis X. This arrangement allows the work 3 to move along the rotation axis X if slippage of the work 3 occurs when the dies 1 are thrust against the work 3. The rotating speed of the work 3 is measurable by a rotation sensor 9 provided in an outer peripheral position of one of the supports 5. The slippage of the work 3 is measurable by a distance sensor 10 disposed coaxially with one of the supports 5.

[Work Configuration and Dies Configuration]

In order to achieve a desired gear, it is required that various factors of the dies 1 be adapted to various factors of the work 3. An outer diameter of the work 3 should be determined such that a dimension obtained by dividing a dimension of the outer circumference of the work 3 by the number of teeth is equal to an addendum circular pitch of the gear to be formed.

Figure 3:
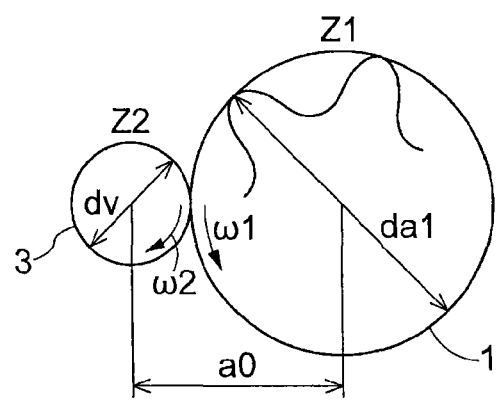
FIG. 3 shows dimensions of the work and a die before thread rolling operation is performed.

FIG. 3 shows a condition in which the die 1 having an addendum circle diameter da1 is just in contact with the work having an outer diameter "dv." A center distance between the die and the work is represented by "a0." In this, the addendum circle diameter da1 of the die for dividing the outer circumference of the work 3 precisely is obtained from Formula (1):

[Formula 1]

$$da1 \approx dv \cdot z1/z2 \quad (1)$$

in which "dv" represents the outer diameter of the work 3, "z1" represents the number of teeth of the die 1, and "z2" represents the number of teeth of the work 3.

Figure 4:
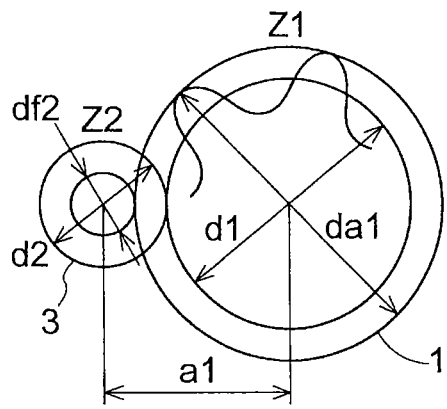
FIG. 4 shows dimensions of the work and the die after the thread rolling operation is performed.

FIG. 4 shows a condition in which a pitch circle of the die 1 is in contact with a pitch circle of the work 3 when the thrusting operation of the die 1 against the work 3 is completed. As understood from FIG. 4, a pitch circle diameter of the die 1 is represented by "d1," a dedendum circle diameter of the finished gear is represented by "df2", and a center distance between the die 1 and the gear in a meshed state is represented by "a1." The center distance "a0" between the die 1 and the work 3 before thrusting the die 1 is:

$$a0 \approx (dv+da1)/2$$

On the other hand, the center distance "a1" after the thrusting operation of the die 1 against the work 3 is completed is:

$$a1=(d1+d2)/2, \text{ and}$$

$$a1=(da1+df2)/2$$

in which "d"1 represents a reference circle of the die.

The sign "df2" in FIG. 4 represents the dedendum circle diameter of a helical gear.

In the thread rolling process, the work 3 and the dies 1 move as follows.

In an initial stage of the thrusting operation as shown in FIG. 3, the motion of the work 3 and the die 1 is considered to be rotary movement of a pair of friction gears, where the addendum circle of the die and the outer circumference (dedendum circle) of the work represent rolling circles. In this, the rotating speed "ω2" of the work 3 is obtained from Formula (2).

$$\omega 2 = \omega 1 \cdot da/(dv-2x) \quad (2)$$

in which "ω1" represents the rotating speed of the die, "ω2" represents the rotating speed of the work, "x" represents the thrusting amount of the die, "da1" represents the addendum circle diameter of the die, and "dv" represents the outer diameter of the work.

On the other hand, the die 1 and the work 3 in FIG. 4 are regarded as the pair of gears meshed with each other, and thus the relationship in Formula (3) is established.

$$\omega 2 = z1/z2 \cdot \omega 1 \quad (3)$$

in which "z1" represents the number of teeth of the die, and "z2" represents the number of teeth of the gear.

In the initial stage of the thrusting operation of the dies 1, the work 3 makes motion as a friction gear until tooth grooves are formed in the surface of the work 3. Thus, the rotary movement of the work represented by Formula (2) is referred to as friction gear movement. In such a state, no slippage occurs.

However, as the tooth grooves are formed and the addendums of the dies 1 successively coming into thrust contact with the work are fitted into the tooth grooves, the work 3 is rotated together with the dies as a gear. More particularly, the work 3 makes rotary movement represented by Formula (3) noted above, which is referred to as gear movement. When the work 3 is rotated in the gear movement, slippage may occur unless the surface of the work is divided by the addendums of the dies properly. More particularly, when the work is rotated in the gear movement, the motion of the work makes differential motion such as advance or reverse of a screw to cause slippage if there is any difference between the rotating speed of the work represented by Formula (2) and the rotating speed of the work represented by Formula (3). Therefore, in order to avoid the occurrence of the slippage, it is required that precise division be done and additionally no slippage of the dies occur against the work at the moment that the rotation of the work is shifted from the friction gear movement to the gear movement.

In particular, in order to achieve the precise division, it is required that a dimension obtained by dividing a dimension of the outer circumference of the dedendum circle of the tooth grooves formed in the work 3 by the number of teeth "Z2" of the work be equal to the addendum circular pitch of the die 1.

On the other hand, in order to avoid the slippage of the dies 1, it is required that a base material of the work 3 appropriately surrounds the circumferences of the addendums of the dies 1. More particularly, it is required that the tooth groove having a sufficient depth be formed. In most cases, the material of the work to be used in thread rolling is generally made of metal such as steel or aluminum. The material made of metal provides plastic deformability to the material per se. Thus, in view of the possibility that the addendums of the dies 1 may slip on the surface of the work 3, walls surrounding the addendums of the dies 1 should be designed to have a proper height.

However, if the walls are too high, the work 3 would need extra base material. In that case, the precision of the finished gear may be marred, or any additional step is required such as correction of the tooth profiles of the dies 1 in order to absorb extra metal. Further, the yield of the material is lowered because of the extra base material needed.

A process for determining the outer diameter of the work 3 more precisely will be described hereinafter.

As an example, a profile of the gear to be formed is shown in Table 1 and a profile of the die 1 is shown in Table 2.

The gear to be formed is a helical gear having two teeth.

The dies 1 are designed so that their reference circles are equal to their pitch circles in a finished condition where the thrusting operation is completed. The number of teeth z1 of the die is set to 85 in view of constraint conditions in attaching the dies to the thread rolling apparatus. The tooth profiles of the dies 1 are involute tooth profiles. The various factors of the dies 1 are calculated on the assumption that the pitch circles of the dies 1 agree with the reference circles of the dies 1 when the thrusting operation of the dies 1 against the work 3 is completed. Thus, when the dies 1 are shifted relative to the work 3 to be processed, a shift coefficient shown in Table 2 would vary. In that case, while the profiles of the dies 1 are not changed, a tooth normal module, a tooth normal pressure angle, and a helix angle are changed.

TABLE 1

| number of teeth to be formed | 2 |
|---|---|
| tooth normal module (mm) | 1.25 |
| tooth normal pressure angle (degree) | 17.5 |
| shift coefficient | 1.1 |
| helix angle (degree) | 45L/H |
| addendum diameter (mm) | 7.8 |
| dedendum diameter (mm) | 3.5 |
| face width (mm) | 32 |

TABLE 2

| number of teeth of die | 85 |
|---|---|
| tooth normal module (mm) | 1.5 |
| tooth normal pressure angle (degree) | 37.4 |
| shift coefficient | 0 |
| helix angle (degree) | 58R/H |
| addendum diameter (mm) | 242.7 |
| dedendum diameter (mm) | 238.4 |
| face width (mm) | 31.2 |

[Precise Division]

Figure 5:
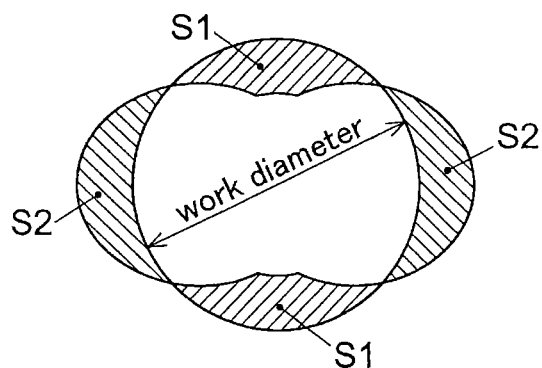
FIG. 5 is an illustration for explaining how a diameter of the work is determined.

The outer diameter of the work 3 was determined prior to designing of the dies. First of all, as shown in FIG. 5, a section taken normal to the axis of the gear was drawn with a CAD to obtain a circle in which sectional area S1 to be thrust by the dies 1 equals sectional area S2 to bulge by the thrusting of the dies. In this case, the number of teeth to be formed was two, the addendum diameter of the die 1 was 242.7 mm, and the number of teeth of the die 1 was 85. Thus, the outer diameter of the work 3 was found to be 5.71 mm, taking into consideration Formula (1) as described above as well. The material used for the work was S45C.

Thread rolling was actually performed using the thread rolling apparatus shown in FIGS. 1 and 2. In this, eight types of works all told were used, in which the outer diameter of the middle-sized work is 5.71 mm. The remaining works with outer diameters ranging from 4.3 mm to 6.5 mm were used for comparison. The results are shown in Table 3.

TABLE 3

| diameter of material (mm) | pitch error (mm) | flank error (mm) |
|---|---|---|
| 4.3 | 2.2 | unmeasurable |
| 4.8 | 1.41 | 46 |
| 5.3 | 0.63 | 26 |
| 5.71 | 0 | 20 |
| 5.91 | 0.63 | 27 |
| 6.0 | 0.86 | 89 |
| 6.25 | 1.26 | unmeasurable |
| 6.5 | 2.04 | unmeasurable |

Die-forming precision was evaluated based on the flank error. While it is considered that a tooth profile error, a flank gradient error and a tooth thickness can be corrected by correcting the tooth surfaces of the dies 1, the flank error cannot be easily corrected by the tooth surface correction and the like.

As shown in Table 3, the work 5.71 mm across has the least flank error and the least pitch error.

Next, the slippage occurred in each of those works 3 during the thread rolling process was evaluated. The slippage can be evaluated by measuring the variations in the rotating speed of the work 3 during the thread rolling process. More particularly, when the thrusting operation is optimally performed by the dies 1, the rotating speed of the work 3 is maintained constant after shifting to the gear movement as long as the rotating speed of the dies is maintained constant. In contrast, in the stage of the friction movement in the initial thrusting operation, the diameter of the work is successively decreased from a state where no tooth grooves are formed in the surface of the work to a state where tooth grooves having a certain degree of depth are formed. Therefore, the rotating speed of the work is increased with the thrusting operation.

Additionally, the farther the initial diameter of the work is deviated from an optimal value, the less precisely the division is performed. Thus, the slippage would occur and continue long after the teeth of the dies are securely meshed with the work, which brings about drastic change in rotating speed of the work.

Then, the changes in rotating speed were measured using the work 4.8 mm across and the work 6.25 mm across, in addition to the work 5.71 mm across exhibiting the least errors during the thread rolling process. The rotating speed of each work was measured with the rotation sensor 9 shown in FIG. 2. The rotation sensor 9 is a photoelectric rotation sensor. A cylindrical element is provided adjacent to the work 3 and has a slit formed therein for generating predetermined pulses in one rotation to allow the sensor to read the rotation of a cylindrical element.

Figure 6:
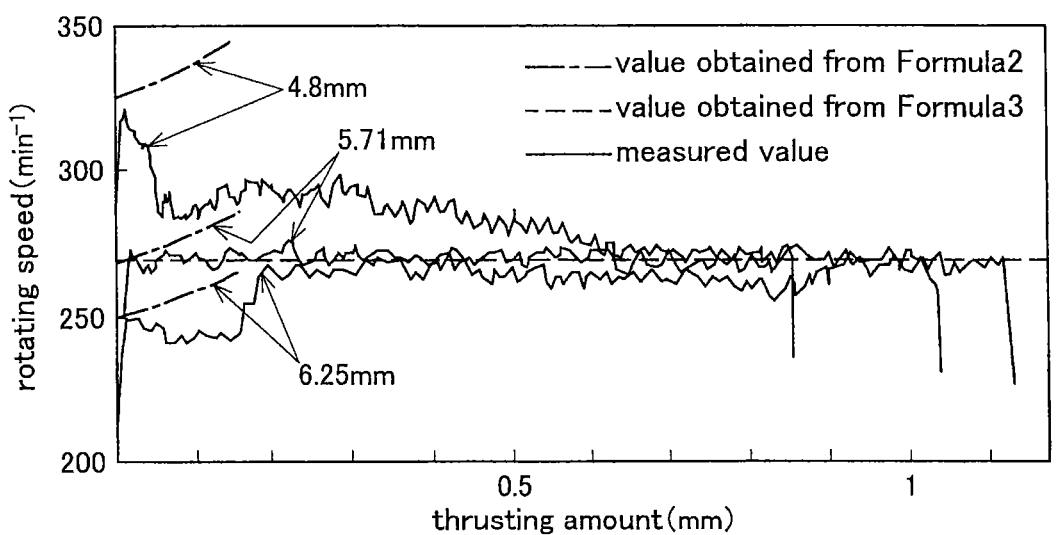
FIG. 6 is a graphic representation showing relationships between thrusting amount of the dies and the rotating speed of the works.

The results are shown in FIG. 6. Variations in rotating speed of the work calculated based on Formula (1) and Formula (2) are also shown for comparison.

Referring to FIG. 6, it is understood that the actual rotating speed in each work agreed with the rotating speed calculated based on Formula (2) or the rotating speed calculated based on Formula (3) in the area in which the thrusting amount is around 0 and the area in which the thrust amount is 0.9 mm or more.

The change in rotating speed of the work 5.71 mm across was small, and agreed with the rotating speed calculated based on Formula (3). It is observed that the rotating speed of the work 4.8 mm across increased to around the rotating speed calculated based on Formula (2) and then gently approached the rotating speed calculated based on Formula (3) from the high-speed rotation side. Further, it is found that the rotating speed of the work 6.25 mm across increased to around the rotating speed calculated based on Formula (2) and then reached the rotating speed calculated based on Formula (3) from the low-speed rotation side.

Figure 7:
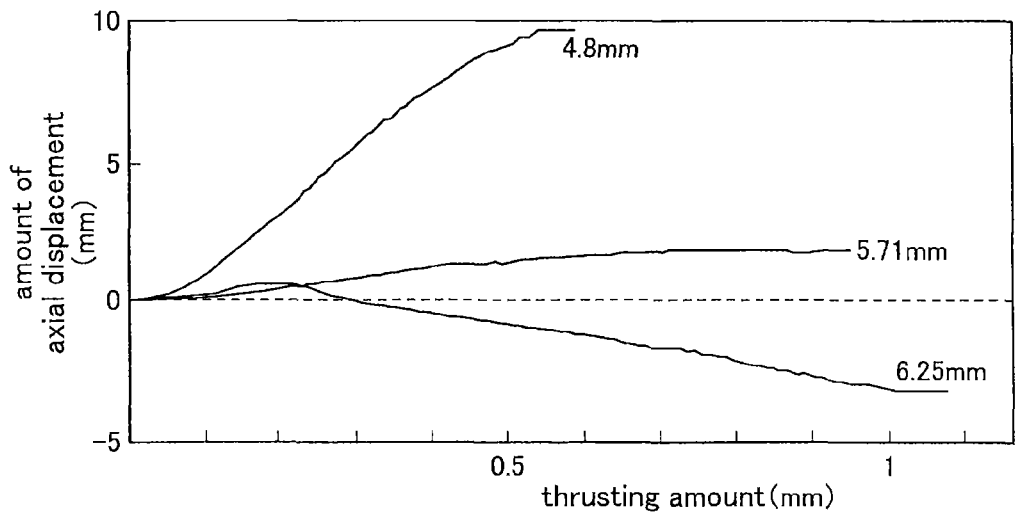
FIG. 7 is a graphic representation showing relationships between the thrusting amount of the dies and axial displacement of the works.

FIG. 7 is data obtained together with the data of FIG. 6, which shows positional change of the support in the axial direction that was observed in the wake of slippage.

As shown in FIG. 2, the measurements were performed with the distance sensor 10 (laser displacement sensor) provided in one side of the table supporting the work 3, in which the position of the table in the axial direction was measured by a laser beam.

In FIG. 7, the slippage to the right side in FIG. 2 is shown with plus sign and the slippage to the left side in FIG. 2 is shown with minus sign.

It was confirmed that the work 4.8 mm across slipped off 10 mm or more to the far side. Since a certain measurement value exceeds a detection range of the distance sensor 10, the data was saturated in a thrusting amount of 0.5 mm or more.

The work 5.71 mm across slipped off only 1.7 mm to the far side.

It was observed that the work 6.25 mm across slipped off to the far side in the range from a thrusting amount of 1 mm to 2.5 mm and then slipped off to the near side.

Further, in order to obtain the diameter of the work with the least slippage, the slippage in each of the works 5.81 mm across, 5.91 mm across and 6.0 mm across, which are close to 5.71 mm, was evaluated.

Figure 8:
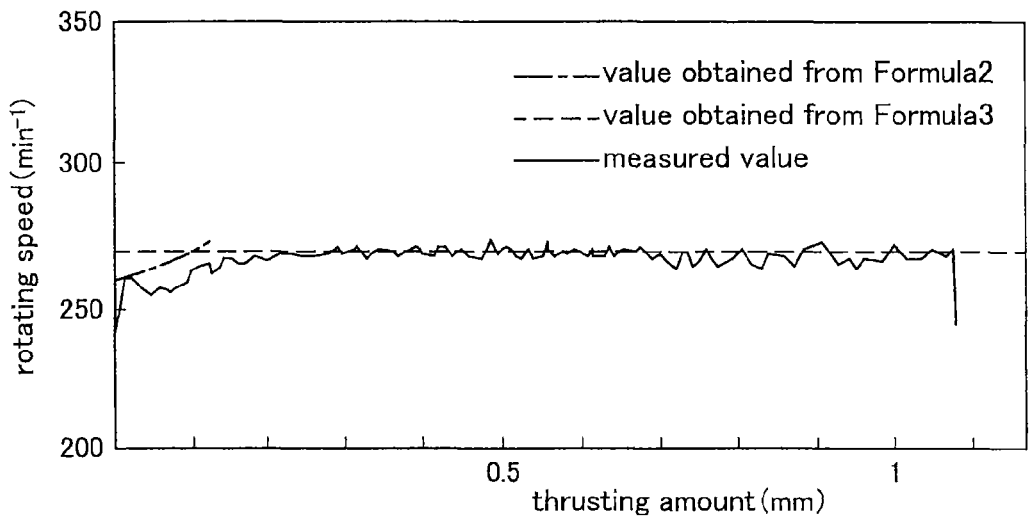
FIG. 8 is a graphic representation showing relationships between the thrusting amount of the dies and the rotating speed of the works, in which the least slippage is exhibited.
Figure 9:
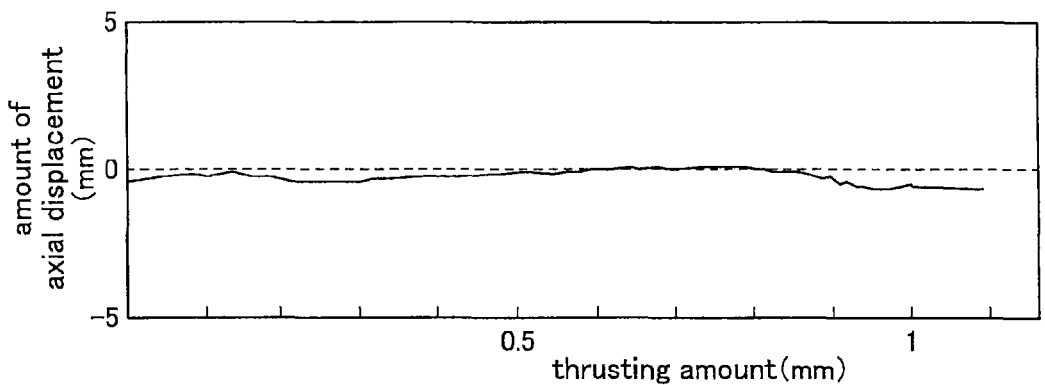
FIG. 9 is a graphic representation of an example, in which the axial displacement of the work relative to the thrusting amount of the dies is the least.

As a result, the work 5.91 mm across, which is 0.2 mm larger than 5.71 mm in diameter, achieved the best results. Referring to FIG. 8, the rotating speed of the work 5.91 mm across agreed with the rotating speed calculated based on Formula (2) in the range up to around a thrusting amount of 0.1 mm where the tooth grooves are formed, and then settled in the rotating speed calculated based on Formula (3). Further, referring to FIG. 9, the work 5.91 mm across exhibited the least slippage of 1 mm or less.

As described above, according to the thread rolling method for the gear of the present invention, the various factors of the gear to be threaded are determined depending on the various factors of the dies 1, and in particular, it is determined that the work 3 has a larger diameter by a predetermined amount. When the material of the work is metal such as steel, and the gear to be formed and the various factors of the dies used in the processing are common, a proper additional dimension for the outer diameter can be determined as 0.2 mm as described above.

Such a dimension is variable depending on the plastic deformability of the material and the size of the work or the dies. Thus, it can be determined that the proper additional dimension is 0.1 to 0.3 mm.

It should be noted that when the thread rolling is performed with the use of not only metal but also thermoplastic resin, the diameter of the work may be large depending on the material to be used.

Alternative Embodiments (Influence of Thrusting Speed)

Figure 10:
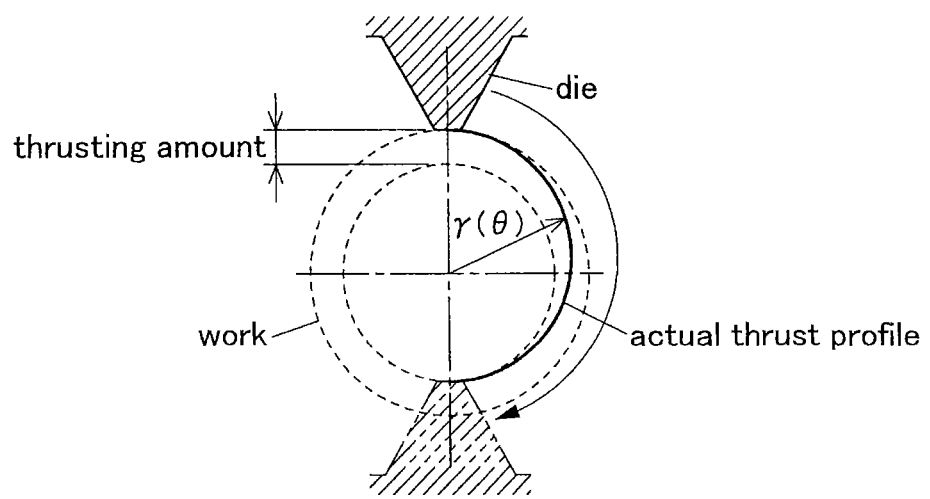
FIG. 10 is an illustration of a trajectory of addendums of the die thrust against the surface of the work.

FIG. 10 is a schematic view showing a trajectory of the addendum of the die as viewed from a direction perpendicular to the axis with the work being fixed. Generally, in the calculation for precise division, an arc length obtained by dividing the dimension of the outer circumference of the work by the number of teeth is determined to be equal to the addendum circular pitch of the die 1. In this, since the dies 1 are thrust against the work as being rotated, the trajectory has the Archimedean spiral. Therefore, a length of the spiral to be actually obtained is smaller than the value obtained from the calculation for precise division performed based on the arc length.

Further, when the thrusting speed of the dies is greater than the rotating speed, a preceding tooth digs into the work deeply and then the following tooth comes into contact with the work. Thus, the angles made by the addendums of the dies relative to the surface of the work are inclined greater. Therefore, the addendums of the dies are not in contact with proper positions of the surface of the work, which may cause slippage.

In view of the above, the pair of dies should be thrust against the work intermittently in thrusting the dies while the rotary movement of the dies and the work is shifted from the friction gear movement to the gear movement.

As a result, the addendums of the dies can be brought into contact with the surface of the work with an angle close to the normal direction. Therefore, the occurrence of the slippage can be effectively restrained by reducing external force components applied from the teeth of the dies to the work along the direction of the rotation axis, for example.

In addition, the thrusting movement in the tooth grooves can be uniform by thrusting the addendums of the dies against the surface of the work intermittently. More particularly, the dies are thrust against all of the tooth grooves in a predetermined manner and then additional thrusting operation is evenly performed on all of the tooth grooves, as a result of which the uniform grooves can be formed over the entire circumference and the surface of the work can be precisely divided. Thus, an accurate thread-rolling gear can be provided.

INDUSTRIAL APPLICABILITY

A thread rolling apparatus and a tread rolling method for a gear using cylindrical dies according to the present invention are applicable to manufacture of various kinds of industrial products such as ball screws, worms, variable-pitch screws, etc., in addition to common bolts and screws.

REFERENCE SIGNS LIST 1 die
3 work
5 support
6 table
7 bed
8 guide element
X rotation axis

The invention claimed is:

1. A threaded rolling method for a gear using cylindrical dies, the method comprising the steps of:

placing a work having a cylindrical outer surface to be supported to a support to be freely rotatable about a rotation axis of the cylindrical outer surface;

placing a pair of the cylindrical dies each rotatable about an axis parallel to the rotation axis to face each other across the work;

thrusting the pair of cylindrical dies against the work, the cylindrical dies being synchronized with each other in rotating speed and thrusting amount via a drive mechanism; and determining an outer diameter of the work, when rotary movement of the cylindrical dies and the work rotated together is shifted from friction gear movement, in which addendum circles of the cylindrical dies and an outer circumference of the work representing rolling circles are rotated together based on thrusting forces exerted from both the cylindrical dies and the work to gear movement based on the engagement between the work and the cylindrical dies at tooth grooves formed in the work by thrusting the cylindrical dies against the work, in which a dimension obtained by dividing an outer circumferential dimension of a dedendum circle of the tooth grooves that have already been formed by the number of teeth to be formed is equal to an addendum circular pitch of each of the cylindrical dies.

2. The threaded rolling method according to claim 1, wherein thrusting amount of the cylindrical dies against the work in shifting to the gear movement is set to 0.1 mm to 0.3 mm.

3. The threaded rolling method according to claim 1, wherein the pair of cylindrical dies are thrust against the work intermittently while the rotary movement is shifted from the friction gear movement to the gear movement.

* * * * *